United States Patent
Mori

(10) Patent No.: US 7,825,788 B2
(45) Date of Patent: Nov. 2, 2010

(54) APPARATUS FOR DETECTING VEHICLE WHEEL POSITIONS THROUGH MEASUREMENT OF TRIGGERING SIGNAL STRENGTH AND NOISE STRENGTH AND APPARATUS FOR DETECTING VEHICLE TIRE INFLATION PRESSURE USING THE VEHICLE WHEEL POSITION DETECTING APPARATUS

(75) Inventor: Masashi Mori, Oobu (JP)

(73) Assignee: Denso Corporation, Kariya (JP)

( * ) Notice: Subject to any disclaimer, the term of this patent is extended or adjusted under 35 U.S.C. 154(b) by 272 days.

(21) Appl. No.: 12/171,446

(22) Filed: Jul. 11, 2008

(65) Prior Publication Data

US 2009/0015393 A1 Jan. 15, 2009

(30) Foreign Application Priority Data

Jul. 11, 2007 (JP) .............................. 2007-181963

(51) Int. Cl.
*B60C 23/00* (2006.01)
(52) U.S. Cl. ........................ 340/447; 340/442; 73/146.5
(58) Field of Classification Search ................. 340/442, 340/445, 447, 539.1; 73/146, 146.2, 146.4, 73/146.5

See application file for complete search history.

(56) References Cited

U.S. PATENT DOCUMENTS

| 5,546,411 | A | 8/1996 | Leitch |
| 6,888,446 | B2 | 5/2005 | Nantz |
| 2007/0008097 | A1 | 1/2007 | Mori |

FOREIGN PATENT DOCUMENTS

| JP | H11-501175 | 1/1999 |
| JP | 2002-107255 | 4/2002 |
| JP | 2004-343210 | 12/2004 |
| JP | 2006-313973 | 11/2006 |
| JP | 2007-015491 | 1/2007 |

*Primary Examiner*—Jeffery Hofsass
(74) *Attorney, Agent, or Firm*—Nixon & Vanderhye PC

(57) ABSTRACT

An apparatus for detecting positions of wheels of a vehicle is provided. In the apparatus, a triggering signal is transmitted from the body side to each transceiver mounted at each wheel. In each transceiver, the strength of the received triggering signal is measured and formatted into a frame of data to be transmitted to a receiver mounted to the vehicle body. The strength of the triggering signal is used to detect wheel positions by determining that each transceiver is disposed at which wheel. The receiver determines if there is a reply of the frame of data containing the strength when the triggering device transmits the triggering signal. When no reply comes from the transceiver, the strength of noise is measured in the transceiver in response to a command from the receiver. When the noise strength is less than a threshold, the receiver commands an alarm member to issue an alarm.

11 Claims, 5 Drawing Sheets

APPARATUS FOR DETECTING VEHICLE WHEEL POSITIONS THROUGH MEASUREMENT OF TRIGGERING SIGNAL STRENGTH AND NOISE STRENGTH AND APPARATUS FOR DETECTING VEHICLE TIRE INFLATION PRESSURE USING THE VEHICLE WHEEL POSITION DETECTING APPARATUS

CROSS REFERENCES TO RELATED APPLICATION

The present application relates to and incorporates by reference Japanese Patent application No. 2007-181963 filed on Jul. 11, 2007.

BACKGROUND OF THE INVENTION

1. Field of the Invention

The present invention relates to an apparatus for detecting the positions of the wheels of a vehicle and an apparatus for detecting tire inflation pressure using such a vehicular wheel position detecting apparatus.

2. Description of the Related Art

One of known apparatuses for detecting inflation pressure of each tire of a vehicle is a direct detection type of apparatus for detecting the tire inflation pressure. This direct detection type of tire inflation pressure apparatus is provided with transceivers directly mounted to wheels to which tires are secured. The sensors are for example pressure sensors. In addition, an antenna and a receiver are provided in the vehicle body, so that the transceiver transmits, to the receiver via the antenna, a pressure detection signal detected by the sensor. Thus the receiver is able to detect the tire inflation pressure of each tire.

In this direct detection type of tire inflation pressure detecting apparatus, it is significant that the apparatus is able to determine whether or not detected pressure data is from the vehicle itself and determine that which transceiver is mounted to which wheel.

Considering such respects, Japanese Patent Laid-open Publication No. 2007-15491 disclose a wheel position detecting apparatus provided with a triggering device located to have different distances from transmitters (serving as transceivers) mounted to the wheels. In this configuration, the fact that a triggering signal outputted from the triggering device decays depending on the distances from the wheels is used to determine that which transmitter is mounted to which wheel. More specifically, the triggering device transmits a triggering signal and each transceiver receives the triggering signal to measure the strength of the received triggering signal. Data indicating the measured signal strength are then transmitted to the receiver provided on the vehicle body. The receiver applies processes to the data to specify the transceiver positions, i.e., the wheel positions.

However, in such a configuration, when the triggering signal is lower in strength than noise, each transceiver cannot receive the triggering signal in good order. In particular, when the noise strength is higher, there is a risk that a transceiver located farther from the triggering device cannot receive the triggering signal at all. In such a case, the transceiver cannot notify the receiver of the data showing the strength of the triggering signal.

If such an occasion happens, the receiver tries in succession to urge the triggering device to output the triggering signal until the receiver receives strength data from the transceiver. When there is provided no strength data from the transceiver even if the triggering signal has been outputted in succession for a certain period of time, the receiver finally decides that there occurs a system malfunction in the apparatus. Hence, a notice for the system malfunction is given to the driver using an alarm, for example. The system malfunction can be defined as malfunctions due to a failure, accident or others derived from the system itself that composes the apparatus. This term "system malfunction" is used to distinguish malfunctions occurring due to external factors such as external noise.

However, the above alarming system is still confronted with a difficulty. Even when a higher-strength noise interferes with the correct reception of the triggering noise at the transceiver in a strongly noisy environment, it is possible to normally detect the wheel positions after the vehicle has passed through the strongly noisy environment, because the apparatus itself has no system malfunction from the beginning. Nonetheless, the apparatus erroneously determines a system malfunction occurring in the apparatus and outputs an alarm, which results in issuing an error alarm.

SUMMARY OF THE INVENTION

The present invention has been made in consideration of the foregoing difficulty, and an object of the present invention is to raise resistance against stronger noise by preventing the apparatus from erroneously determining system malfunctions in cases where there is no actual system malfunction.

In order to achieve the above object, as one aspect, there is provided an apparatus for detecting positions of wheels of a vehicle having a body (7), comprising: a plurality of transceivers mounted at a plurality of wheels (6a-6d) each having a tire, wherein each transceiver comprises a reception unit (25) comprising means for receiving a triggering signal, a first control unit (22) comprising means for measuring a strength of the received triggering signal and containing data indicative of the measured strength of the received triggering signal into a frame of data, and a transmission unit (23) that transmits the frame of data produced by the first control unit; a triggering device (5), arranged to the body, that outputs the triggering signal; a receiver (3), arranged to the body, comprising a reception unit (32) that receives the frame of data and a second control unit (33) that determines that, based on the strength expressed by the data contained in the frame of data, each transceiver is disposed at which one of the plurality of wheels; and an alarm member (4) that issues an alarm when there occurs a system malfunction in the apparatus. In this configuration, the reception unit (25) further comprises means for receiving a command for measuring noise strength; the first control unit (22) further comprises means for calculating a strength of noise in response to reception of the command and contains data indicative of the calculated strength of the noise into a frame of data; and the second control unit comprises various means. These means include means for determining whether or not there is a reply of the frame of data containing the strength when the triggering device transmits the triggering signal, means for enabling the triggering device to transmit to the transceiver the command for measuring noise strength, when no reply comes from the transceiver, means for determining whether or not a noise strength based on the frame of data received in response to the command is less than a threshold, and means for controlling the alarm member so that the alarm member is allowed to issue the alarm only when it is determined that the noise strength is less than the threshold.

Accordingly, when no reply can obtained from the transceivers in response to transmitting the triggering signal, the strength of noise surrounding each transceiver is measured.

This noise measurement makes it possible that examine the reason why there is no reply from the transceivers. That is, it is possible check whether the reasons is due to either strong noise continuously surrounding the transceivers or system malfunctions such as a malfunction occurring in the hardware and/or software of a transceiver or a battery shutoff. Hence it is possible to avoid the erroneous determination that a system malfunction occurs although the system is practically in its normal state.

Other advantageous configurations and operations of the present invention will be clarified through preferred embodiments described with the accompanying drawings.

BRIEF DESCRIPTION OF THE DRAWINGS

In the accompanying drawings:

FIG. 2B is a diagram exemplifying the structure of a frame of data for a response, which is produced by and transmitted from each transceiver in detecting the wheel positions;

DETAILED DESCRIPTION OF THE PREFERRED EMBODIMENTS

Figure 1:
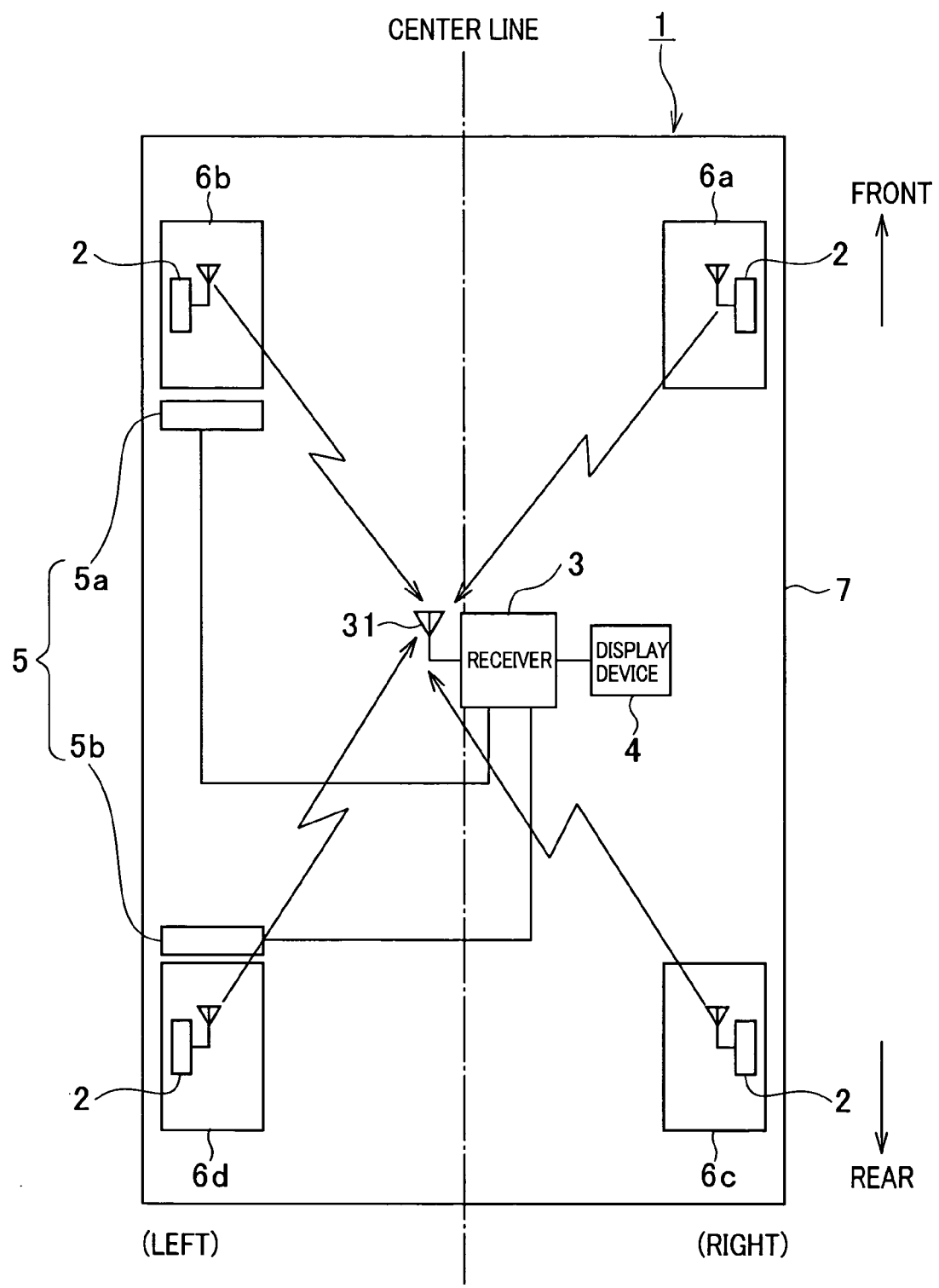
FIG. 1 is a scheme outlining the overall structure of a tire inflation pressure detecting apparatus in which a wheel position detecting apparatus according to a first embodiment of the present invention is functionally implemented.

Hereinafter, referring to the accompanying drawings, various embodiments of the present invention will now be described. In the following embodiments, the same or similar components are given the same reference numerals for the sake of a simplified description.

First Embodiment

Referring to FIGS. 1-5, a first embodiment will now be described.

FIG. 1 shows the overall configuration of a tire inflation pressure detecting apparatus to which the wheel position detecting apparatus according to the first embodiment of the present invention is functionally applied.

The tire inflation pressure detecting apparatus is installed to a vehicle 1 and configured to detect the inflation pressure of four tires each of which is fitted to one of four wheels 6a-6d of the vehicle 1 (i.e., the front right (FR) wheel 6a, the front left (FL) wheel 6b, the rear right (RR) wheel 6c, and the rear left (RL) wheel 6d) or one of five wheels including a spare tire.

As shown in FIG. 1, the tire inflation pressure detecting apparatus, which is or is to be mounted on a vehicle 1, includes four transceivers 2, a receiver 3, a display device 4, and triggering devices 5 (5a and 5b). In the present embodiment, the transceivers 2, receiver 3, display device 4, and trigging devices 5 compose the wheel position detecting apparatus according to the present invention.

Each of the transceivers 2 is mounted on each of the four wheels 6a-6d (or the five wheels including the spare tire), so as to have association with the tire on each of the wheels 6a-6d. Each transceiver 2 works to sense the inflation pressure of the associated tire and transmit a frame of data that contains tire pressure information indicative of the sensed inflation pressure of the associated tire.

On the other hand, the receiver 3 is mounted on the body 7 of the vehicle 1. The receiver 3 works to receive all the frames of data transmitted by the transceivers 2 and determine the inflation pressure of each of the four tires based on the tire pressure information contained in the received frames of data.

Figure 2:
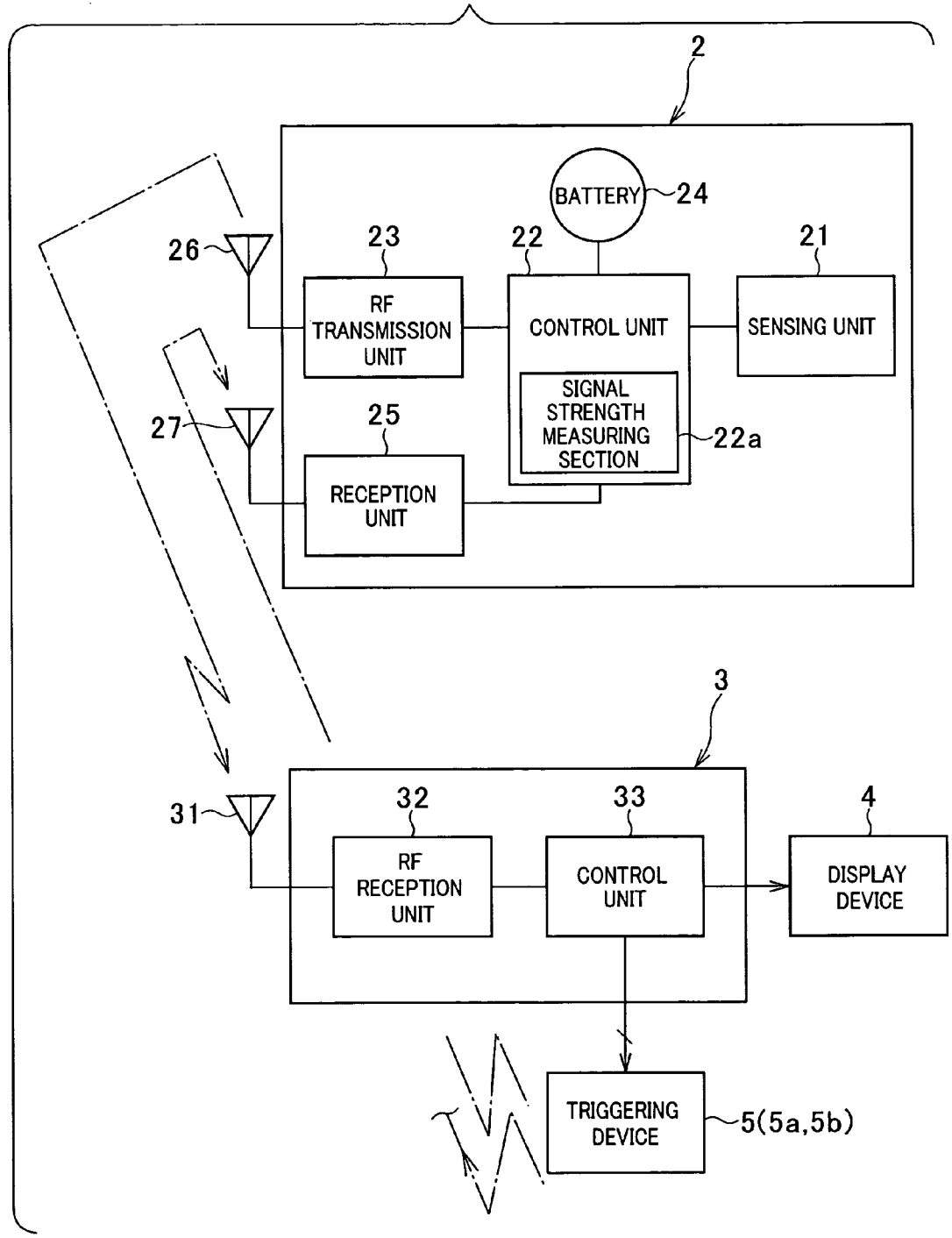
FIG. 2 is a block diagram showing transceivers, a receiver and a triggering device provided in the tire inflation pressure detecting apparatus.

FIG. 2 shows in block forms the configurations of each of the transceivers 2 and the receiver 3, respectively. As shown in FIG. 2A, each transceiver 2 is provided with a sensing unit 21, a control unit 22, an RF transmission unit 23, a battery 24, a reception unit 25, a transmission antenna 26, and a reception antenna 27.

The sensing unit 21 is provided with sensors, such as a diaphragm-type pressure sensor and/or a temperature sensor, and works to output signals indicative of the sensed inflation pressure of the tire and/or the sensed temperature of air in the tire. In the present embodiment, these signals are referred to as data in relation to tire inflation pressure.

The control unit (the first control unit) is configured as a known microcomputer provided with a CPU, a ROM, a RAM and an I/O and is able to execute given processes based on programs previously stored in the ROM.

Practically, the control unit 22 receives, from the from sensing unit 21, the detection signals in relation to the tire inflation pressure, and applies signal processes to the detection signals and if necessary, convert the detection signals based on desired techniques. These processes provide data in relation to the tire inflation pressure. Thus the control unit 22 stores those data into a frame of data to be transmitted tot the transmission unit 23, where the frame of data includes ID information of each transceiver 2. This transmission process to the transmission unit 23 is repeated at intervals according to one or more of the programs.

In the normal state, the control unit 22 is in a "sleep state" when the ignition switch is made "off." When receiving the triggering signal including an activation command and reading the activation command, the control unit 22 switches to a "wake-up state." The control unit 22 is provided with a signal strength measuring section 22a which measures the strength of the triggering signal together with noise around the control unit 22, that is, each transceiver 2. Specifically, when the control unit 22 receives the triggering signal from the triggering device 5 via the reception antenna 27 and the reception unit 25, the control unit 22 becomes the waked-up state, which allows the signal strength measuring section 22a to measure the strength of the received triggering signal. And the control unit 22 adds, if necessary, desired conversion to data indicative of the strength of the measured triggering signal, and stores the strength data into either a frame of data containing data showing the tire inflation pressure or another frame of data. After this, the control unit 22 provides the frame(s) of data to the transmission unit 23.

The processes for measuring the triggering signal strength and providing the strength data thereof to the transmission unit 23 are conducted according to one or more of the foregoing programs.

Additionally, the control unit 22 is formed to control time instants (i.e., timing) at which the frames of data are transmitted to the transmission unit 23. This timing control is for avoiding the data transmitted from the respective transceivers 2 interfering or butting with each other. For example, transmission timing, which is set to a time instant coming after the reception of a triggering signal and is for starting transmission of the frame of data, is set differently from each other among the transceivers 2. Thus the transceivers 2 at the respective wheels 6a-6d are able to transmit frames of data at mutually different timings.

However, the above transmission at mutually different timings cannot be achieved by simply memorizing different transmission timings into the respective control units 22 of the respective transceivers 2. That is, such a simple memorization results in different memorized contents in the respective transceivers 2. Hence, depending on the strength of the triggering signal to be received, it is required to shift the transmission timings at which frames of data are started to be transmitted. This shift in the transmission timings is realized by for example using a map or calculation. In the case of using the map, the map is produced to allow proper transmission timings to be selected in accordance with the reception strength of the triggering signal. In the case of calculation, the control unit 22 memorizes therein a function formula for transmission timing, which involves, as a variable, transmission strengths of a triggering signal, and calculation is made to automatically shift the transmission timings depending on differences in the reception strengths of the respective triggering signals. By using this way of setting the transmission timings, it is possible to use the same program in the control units 22 of all the transceivers 2.

In addition, the program memorized in the control unit 22 can be set such that the transmission timing at each transceiver 2 is changed at random every transmission. This random changing makes it possible to make the transmission timings at the respective transceivers 2 different from each other at a higher probability.

The transmission unit 23 serves as an output member to transmit, through the transmission antenna 26, toward the receiver 3, the frame of data coming from the control unit 22 with the use of RF-range electromagnetic waves of, for example, 310 MHz.

The reception unit 25 is produced to receive, through the reception unit 27, the triggering signal. Therefore this control unit 22 serves as an input member to the control unit 22.

The battery 24 is placed to power the control unit 22 and other members. Hence, thanks to the power from battery 24, the units are able to achieve their assigned functions. Thus the control unit 22 is able to perform acquisition of the data relating to the tire inflation pressure from the sensing unit 21 as well as various types of calculation.

Each of the transceivers 2, constructed above, is for example attached to an air injection valve of each of the wheels 6a-6d in such a way that its sensing unit 21 is located and exposed inside the tire. By this arrangement, the tire inflation pressure of each wheel is detected as signal indicating the pressure at sampling intervals (for instance, every one minute), whereby the detection signal is transmitted, via the transmission antenna 26, from each transceiver 2 to the receiver 3 every sampling interval.

As shown in FIG. 2, the receiver 3 is configured with a reception antenna 31, an RF reception unit 32, and a control unit 33.

The reception antenna 31, which is one in number and in common to all the transceivers 2, is fixed to the body 7 of the vehicle 1 to receive, as illustrated in FIG. 1, all the frames of data transmitted from the respective transceivers 2.

When the frames of data from each transceiver 2 are transmitted to the reception antenna 31, the reception unit 32 inputs the frame of data and sends them to the control unit 33. Hence the reception unit 32 serves as an input member to the control unit 33.

The control unit 33 is provided with a CPU, a ROM, a RAM, and an I/O so that these members compose a microcomputer. The control unit 33 performs predetermined processes in accordance with programs prepared in advance in the ROM.

Practically, the control unit 33 is produced to output a triggering command signal, which commands the triggering device 5 to output a triggering signal, and receive the frames of data which are received by the reception unit 32. Using the strength data of the triggering signals each received by each transceiver 2 and each stored in each frame of data, the control unit 33 determines that each frame of data has been transmitted from which one of the transceivers 2 respectively attached to the four wheels 6a to 6d. This determination is referred to as detection of wheel positions.

After allowing the triggering device 5 to output the triggering signal, the control unit 33 checks whether or not, for a plurality of processing periods, the frames of data with triggering-signal strength data have not been returned from a transceiver 2. When it is found that such no return of the frames results from a system malfunction, the display device 4 is notified of the system malfunction.

Moreover, the control unit 33 calculates a tire inflation pressure by applying various signal processes and calculation techniques to the data indicative the strength of the triggering signal and outputs to the display device 4 an electric signal showing the calculated tire inflation pressure. To be specific, the control unit 33 compares the calculated tire inflation pressure with a given threshold Th. When this comparison shows a drop in the tire inflation pressure, a signal expressing this pressure drop is sent to the display device 4. Hence the display device 4 is notified of the fact that the tire inflation pressure at any one or more of the four wheels 6a to 6d has been reduced.

The display device 4, which functions as an alarm device, is arranged at a driver's visible part of the vehicle. By way of example, the display device 4 is an alarm lamp arranged in the instrument panel of the vehicle 1. In response to a signal showing a system malfunction and a signal showing a drip in the tire inflation pressure, which come from the control unit 33 in the receiver 3, the display device 4 provides the driver with a notice showing the occurrence of the system malfunction in the apparatus.

The triggering devices 5 (5a, 5b) are formed to respond to the triggering command signal coming from the control unit 33 in the receiver 3. In reply to this trigging command signal, the triggering devices 5 operate to output triggering signals having a frequency of for example 125 to 135 kHz in an LF band and having a predetermined signal strength (amplitude). In the present embodiment, the triggering devices 5 are composed of two triggering devices which consists of a first triggering device 5a disposed on the front wheel side and a second triggering device 5b disposed on the rear wheel side. The reason why the two triggering devices 5a and 5b are disposed is that an upper strength of available the electromagnetic waves is limited by law, so that use of only one triggering signal has a difficulty that some of the transceivers 2 may not be able to or are not able to receive the electronic magnetic wave. To cope with this concern, the present embodiment employs the two trigging devices 5a and 5b, in which the first trigging device 5a is in charge of reliably transmitting the trigging signal to the front right and left wheels 6a and 6b, whilst the second triggering devices 5b is in charge of reliably transmitting the triggering signal to the rear right and left wheels 6c and 6d.

Figure 3A:
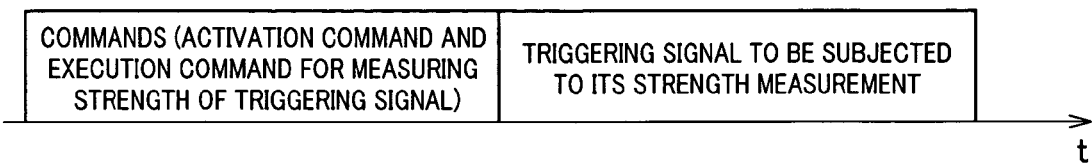
FIG. 3A is a diagram exemplifying the structure of a frame of data composing a triggering signal used in detecting the wheel positions.

FIG. 3A exemplifies the structure of a frame of data for the triggering signal used to detect the wheel positions. By way of example, the triggering signal is an electromagnetic wave of 125 kHz and is made up of a command section and a signal section which are lined up in the time domain. The command section includes an activation command and an execution command, while the signal section includes a triggering signal to be subjected to its strength measurement.

The activation command is previously set as a command to activate the control unit 22 in each transceiver 2 such that the control unit 22 is switched from the sleep state to the wake-up state. The execution command is for actions of enabling the measurement of the received triggering signal, processing the strength data of the triggering signal if required, storing the strength data into either a fame of data containing the tire inflation pressure or another frame of data, and then making the transmission unit 23 transmit the frame of data.

Figure 3B:
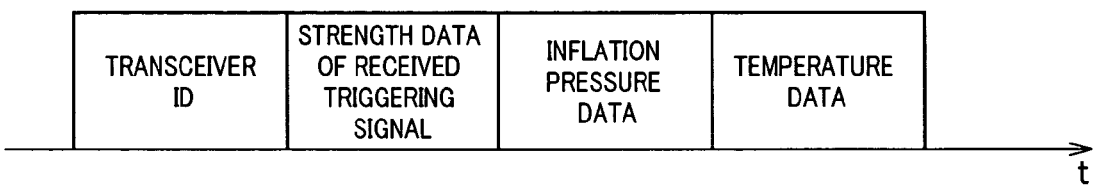

FIG. 3B exemplifies the structure of a frame of data for the response, which is produced by the transceiver 2. As shown, each frame contains ID information assigned to each transceiver 2, data showing the strength of the triggering signal (strength data), data showing the tire inflation pressure (tire inflation pressure data), and data showing temperature within each tire. This frame of data is transmitted from the respective transceiver 2 to the receiver 3, which allows the receiver 3 to detect the noise strength.

The signal for detecting the triggering signal strength shown in FIG. 3A is a dummy signal with no command, and may be modulated or may simply be a carrier signal with being modulated.

The structure of the triggering signal shown in FIG. 3A is just one example, and the triggering signal may be produced in different formats.

The two triggering devices 5a and 5b are positionally offset to the central line symmetrically dividing the vehicle body 7 in the lateral direction such that distances from each triggering device 5a (5b) to the front or rear two wheels 6a and 6b (6c and 6d) assigned to the triggering device are different from each other. In the present embodiment, the first and second triggering devices 5a and 5b are located on the left side of the vehicle body 7 far from the central line, where the first triggering device 5a is located closer to the left front wheel 6b and the second triggering device 5b is located closer to the left rear wheel 6d. Hence the distance between the first triggering device 5a and the right front wheel 6a is longer than that between the first triggering device 5a and the left front wheel 5b. As the rear wheels, the distance between the second triggering device 5b and the right rear wheel 6c is longer than that between the second triggering device 5b and the left rear wheel 6d.

In addition, the distances from the transceivers 2 mounted to both front wheels 6a and 6b to the first triggering device 5a are set to be always shorter than those to the second triggering device 5b regardless of rotation of both front wheels 6a and 6b. In the same way, the distances from the transceivers 2 mounted to both rear wheels 6c and 6d to the second triggering device 5b are set to be always shorter than those to the first triggering device 5a regardless of rotation of both rear wheels 6c and 6d. To keep this geometrical relationship, the mounting positions of the first and second triggering devices 5a and 5b are decided.

Incidentally, the triggering devices can be arranged at any vehicular part as long as that part is not completely covered by a metal member. Especially, it is preferable that the triggering devices 5a and 5b be arranged at vehicular parts which do not need a metal cover as much as possible and protects the triggering devices 5a and 5b from being hit by stones or others during the run of the vehicle 1. Such vehicular parts are, for example, the vehicle interior In this way, the tire inflation pressure detecting apparatus is configured, in which the wheel position detecting apparatus is also functionally realized.

The operations of the tire inflation pressure detecting apparatus according to the present embodiment will now be described.

This detecting apparatus starts its wheel position detection at a time when a predetermined period of time has elapsed from at a time when the not-shown ignition switch is switched over from its off state to its on state. The processing for this wheel position detection is executed by the control unit 33 of the receiver 3.

Figure 4:
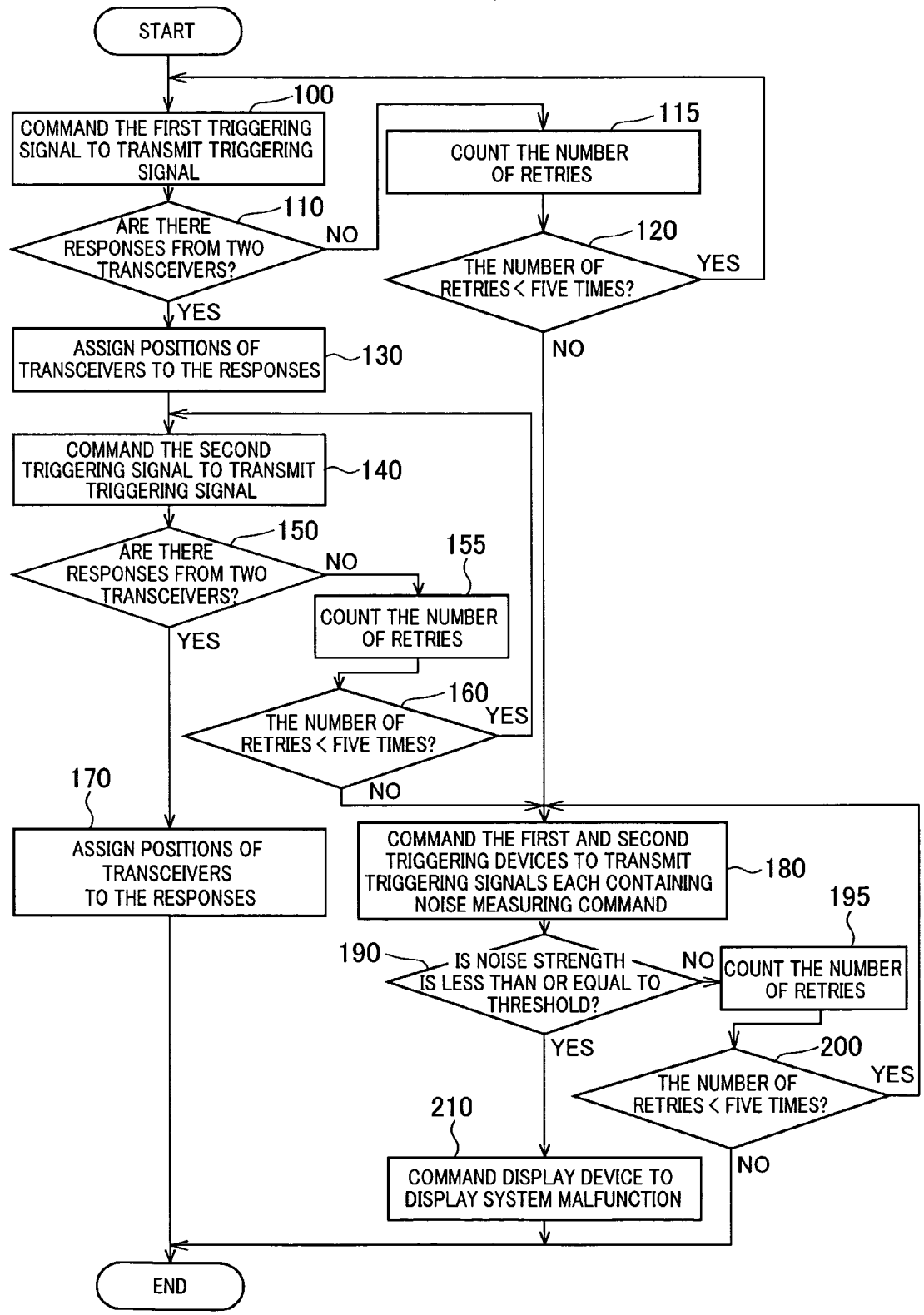
FIG. 4 is a flowchart showing a process for detecting the wheel positions, which is executed by a control unit installed in a receiver.

FIG. 4 is a flowchart for the wheel-position detecting processing executed by the control unit 33 of the receiver 3. This processing is activated in response to switching the ignition switch and thus powering the control unit 33.

At step 100 in FIG. 4, the control unit 33 outputs a trigging command signal to the first triggering device 5a when a predetermined period of time has elapsed from the power-on operation. In response to the input of the trigging command signal to the first triggering device 5a, this trigging device 5a transmits a triggering signal having a predetermined signal level, toward the transceivers 2 mounted to the right and left front wheels 6a and 6b via the antenna 31.

The trigging signal is transmitted in the air and inputted to the control unit 22 via the reception antenna 27 and reception unit 25, which are arranged to and in the transceivers 2 for each of the right and left front wheels 6a and 6b. This input of the triggering signal allows the control unit 22 to be awaken (i.e., becomes the wake-up state), so that the signal strength measuring section 22a is allowed to measure the strength of the received triggering signal.

After detection of the strength of each received trigging signal, each transceiver 2 stores, into a frame of data, data indicating the detected strength as well as ID (identification) information to distinguish each transceiver 2 from the others, and then transmits the frame of data to the receiver 3. In this situation, the transmission timings, at which the respective transceivers 2 mounted to the wheels, are made different from each other. As a result, it is possible that the frames of data sent from the respective transceivers 2 are received by the receiver 3 without mutual interference.

Then at step 110, it is determined whether or not the two transceivers 2 have responded to the triggering signal from the first triggering device 5a. The two transceivers 2 mean transceivers mounted to both front wheels 6a and 6b, respectively.

When manufacturing the present apparatus, the design is made with taking it account the directivity of the triggering devices, the geometrical relationship among the transceivers 2, and other factors. Hence, basically, such design enables the triggering signal from the first triggering device 5a to be received by the transceivers 2 mounted to both front wheels 6a and 6b. However, in a circumstances where there occurs a strong noise (, for example, the vehicle 1 parks close to a facility or building from which disturbing waves are radiated), it may probably be difficult to receive the triggering signal in good order due to the poor electromagnetic wave environment. In such a situation, there is a possibility that at least one of the two transceivers 2 mounted to both front wheels 6a and 6b is difficult to receive the triggering signal. If such a difficult is caused, all the two frames of data cannot be received from the two transceivers 2. This means that it cannot be determined at step 110 that the two transceivers 2 for the so front wheels have responded, resulting in the negative (NO) determination at step 110. Hence to retry the foregoing processes, the processing is made to shift to steps 115 and 120. At step 115, a not-shown counter implemented in the control unit 33 is incremented to count and store the number of retries.

At step 120, it is determined if or not the number of retries is still five times or less than five times (i.e., a given threshold). When the number of retries is five times or less than five times, the processing is returned to step 100 for retrying the foregoing procedures at steps 100 and 110. In contrast, when the number of retries is over five times, the processing is shifted to step 180 without the retry any more. At step 180, the reason why there is (are) no response(s) from the two transceivers 2 is examined as detailed later.

On the other hand, when it is determined that there have been the two responses from the two fronts-side transceivers 2, the processing is shifted to step 130, where the strength data stored in the received two frames are used to assign wheel positions. Practically, the strength data and the ID information are read out from the two frames received at step 110, the bits of the ID information are sorted in the order along which the signal reception strengths are lowered. Then it is decided such that the ID information showing a higher signal reception strength is from the transceiver 2 mounted to the left front wheel 6b, while the remaining one, that is, the ID information showing a lower signal reception strength, is from the transceiver 2 mounted to the right front wheel 6a. Thus correspondence is made between the bits of ID information stored in the respective frames and the right and left front wheels 6a and 6b, and then stored (registered) in the memory in the control unit 33.

The processing is then shifted to step 140, where a triggering command signal is issued to the second triggering device 5b. Then steps 150, 155 and 160 follows, where the similar processes to those at steps 110, 115 and 120 are conduced for the rear wheels 6c and 6d. Though these processes are omitted from the description, performing the processes at steps 150, 155 and 160 makes it possible to determine whether or not the data indicating the strength of the trigging signal have been received without fail from the two transceivers respectively mounted on both rear wheels 6c and 6d Further, the process at step 170 is executed in the same way as the foregoing step 130, so that it is decided that the ID information showing a higher signal reception strength is from the transceiver 2 mounted to the left rear wheel 6d, while the remaining one, that is, the ID information showing a lower signal reception strength, is from the transceiver 2 mounted to the right rear wheel 6c. Thus correspondence is made between the bits of ID information stored in the respective frames and the right and left rear wheels 6c and 6d, and then stored (registered) in the memory in the control unit 33, before finishing the detection of the wheel positions.

On the other hand, the determination at step 120 or 160 reveals that the number of retries reaches five times, that is, it is not confirmed that all the two transceivers 2 have not responded, processes for examining the reason for the non-response are executed in sequence at step 180 and subsequent steps.

Specifically, at step 180, the reason for the non-response is examined from the two aspects; the vehicle 1 has been continuously put in an environment with a strong noise and there have occurred system malfunctions such as a failure of the transceivers 2 or a buttery shutoff (called system malfunctions). For examining the system from such view points, transmitting a command to transmit a triggering signal containing a noise strength measuring command is issued to the first and second triggering devices 5a and 5b. Such a trigger single is referred to as a noise-strength measurement command signal. This issuance permits the signal strength measuring section 22a in control unit 22 of each transceiver 2 to measure the strength of noise therearound. One example is that, when the triggering signal having a frequency of 125-135 kHz is used for detecting the wheel positions, the triggering signal is liable to be affected by noise having frequencies of 100-200 kHz. Hence the noise strength measurement is particularly performed in this frequency band.

In cases where the reason for the non-response lies in the fact that the vehicle 1 has been continuously put in an environment with a strong noise, it is highly probable that the triggering signal containing the noise strength measuring command cannot be received as well. However, it is highly probable that transceivers which cannot receive the triggering signal due to the noise are the transceivers 2 mounted to the right front wheel 6a and the right rear wheel 6c located farther from the first and second triggering devices 5a and 5b, respectively. Conversely, it is possible that, at least, the transceivers 2 mounted to the left front wheel 6b and the left rear wheel 6d located closer to the first and second triggering devices 5a and 5b, respectively, can receive the triggering signal.

In addition, if the non-response is due to noise, it is highly probable that the noise is spread widely, in particular, during the run of the vehicle 1. Hence, the noise measurement at the transceivers 2 mounted to the left front wheel 6b and left rear wheel 6d closer to the first and second triggering devices 5a and 5b becomes synonymous with measuring the noise affecting the transceivers 2 mounted to the left front wheel 6b and the left rear wheel 6d located farther from the first and second triggering devices 5a and 5b.

Figure 5A:
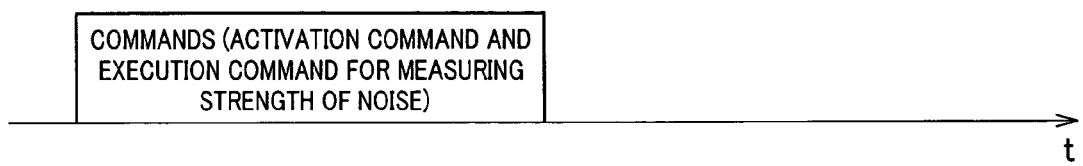
FIG. 5A is a diagram exemplifying the structure of a frame of data composing a triggering signal used in measuring the strength of noise.

FIG. 5A exemplifies the structure of a frame of data composing the triggering signal for measuring the noise strength. As shown, the triggering signal is for example an electromagnetic wave of a frequency of 125 kHz and contains only a command section. The command section contains an activation command and an execution command. The activation command is the same as that used for detecting the wheel positions. The execution command is used to enable the measurement of strength of noise around each transceiver, give processes to produced noise strength data if necessary, store the noise strength data into either a frame of data containing data of the tire inflation pressure or another frame of data, and send the produced frame of data to the transmission unit 23.

Figure 5B:
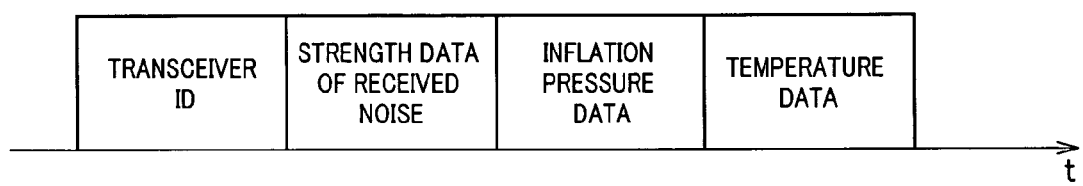
FIG. 5B is a diagram exemplifying the structure of a frame of data for a response, which is produced by and transmitted from each transceiver in detecting the noise strength.

Meanwhile FIG. 5B exemplifies the structure of a frame of data for the response, which is produced by each transceiver 2 when the strength of noise is measured. As shown, this frame contains noise strength data, tire inflation pressure data, and data of temperature in each tire, as well as ID information showing each transceiver 2. Transmitting this frame from each transceiver 2 to the receiver 3 makes it possible that the receiver 3 detects the strength of the noise.

The triggering signal described above is just one example, and may be modified into other formats.

In this way, in response to the command at step 180, the noise strength measurement is carried out using the respective transceiver 2. After this, the processing is moved to step 190, where the frames transmitted from the respective transceivers 2 are received to read out the nose strength data contained in each frame, and the determination whether or not the noise strength is less than a given threshold. The threshold is a criterion to determine that the non-response from the two transceivers 2 is due to either being continuously exposed in an environment with a severe noise or occurrence of system malfunctions such as a failure in a transceiver 2 or a buttery shutoff.

If the determination at step 190 reveals that the noise strength is higher than the threshold (i.e., NO at step 190), the reason for the non-response can be considered as vehicle's continuous exposure in the highly noisy environment. In this case, at step 195, a not-shown retry counter in the control unit 33 is incremented, and then the processing moves to step 200, where it is determined whether or not the number of retries is five times or less than five times. In the case that the determination is YES at step 200, that is, the retry number is still less than five times, the processing is returned to step 180. In contrast, the determination is NO at step 200, that is, the retry number reaches five times, it is estimated that the reason for the non-response from the two transceivers 2 is that the vehicle is continuously exposed to a highly noisy environment. Hence, in this case, the retry processing is stopped to finish the current process without notifying any system malfunctions.

Conversely, the noise is not highly strong, the reason for the non-response from the two transceivers 2 is considered as being caused by system malfunctions such as failures in a transceiver 2 or a battery shutoff. Based on this assumption, when the determination at step 190 is affirmative (YES), the processing goes to step 210, where a signal showing the system malfunction is sent to the display device 4, with the system malfunction rendered on the display 4.

In this way, the process for detecting the wheel positions is completed. Through this detection process, the positions of the wheels can be detected reliably, in which it can be determined whether the non-response from the transceivers 2 is due to either being higher noise or a system malfunction. In addition, for detecting the tire inflation pressure later described, the receiver 3 uses the ID information and the tire inflation pressure data contained in each of the frames to be sent in sequence, specifies, of the four transceivers 2, which transceiver 2 has transmitted which frame, and calculates the tire inflation pressure of the respective wheels 6a-6d, Detailed operations of the tire inflation pressure detecting apparatus are as follows.

After the wheel position detection, this tire inflation pressure detecting apparatus is brought into its regular transmission mode, in which, as described, in each transceiver 2, the control unit 22 receives, from the sensing unit 21, the detection signals showing the tire inflation pressure and the in-tire temperature. The detection signals are subjected to signal processing according to need, so that data indicative of the tire inflation pressure is produced. The produced tire inflation pressure data are then stored in the frame of data to be transmitted with the ID information of each transceiver 2, and transmitted to the receiver 3 via the transmission unit 23 at intervals, Meanwhile, the frame that has been transmitted from each transceiver 2 is received by the antenna 31 and given to the control unit 33 via the reception unit 32. In the control unit 33, data indicating the tire inflation pressure and data indicating the temperature within each tire are read from the received fames. The data indicating the temperature is subjected to temperature correction, if necessary, and the tire inflation pressure is calculated. In this calculation, the ID information is stored in each frames, whereby this ID information is referred to the ID information stored where the wheel detection was conducted. Based on this reference, it is determined that each frame has been transmitted from which transceiver 2 mounted to any of the four wheels 6a-6d.

When a difference between the current tire inflation pressure and the last-calculated tire inflation pressure is below a given threshold, the period for detecting the tire inflation pressure remains as it is now (for example, every one minute). By contrast, when the tire inflation pressure changes largely such that the difference is over the given threshold, the detection measurement is shortened (for example, every 5 seconds).

In cases it is determined the calculated tire inflation pressure is below a given value, the control unit 33 provides the display device 4 with a signal indicating the lowered tire inflation pressure. In response to this signal, the display device 4 represents a notice which makes the driver understand which one or more of the four wheels 6a-6d are subjected to a decrease in tire inflation pressure.

Finally, when the ignition switch is switched off from its on state, the control unit 33 in the receiver 3 again outputs a triggering command signal to the triggering devices 5, whereby the triggering signals are transmitted from the triggering devices 5. These trigging signals arrives at the control unit 22 via the reception antenna 27 and the triggering signal reception unit 25. When this reception is confirmed, the transceivers 2 are switched to its sleep state, and the tire inflation pressure detection is ended.

As described, the tire inflation pressure detecting apparatus functionally provided with the wheel position detecting apparatus is able to provide a higher resistance against stronger nose. The reason is as follows. In detecting the wheel positions, the trigging signal is transmitted outside from the first and second triggering devices 5a and 5b. In this case, if there is no response from two transceivers 2, (which are probably the transceivers 2 attached to the right front and rear wheels 6a and 6c which are farther from the trigging devices 5a and 5b), the trigging signal for the noise strength measurement is then transmitted outside. It is therefore possible to check that the reason for the non-response from the two transceivers 2 lies in being exposed continuously in the heavy noise environment or in occurrence of system errors such as system malfunctions of the transceivers 2 or battery shutoff. Accordingly, when strong noise interferes with the reception of the triggering signals at the transceivers 2 attached to the wheels 6a-6d, to erroneously determine that there occurs a system malfunction in the apparatus, but actually there is no system malfunction, can be avoided.

Second Embodiment

Figure 6:
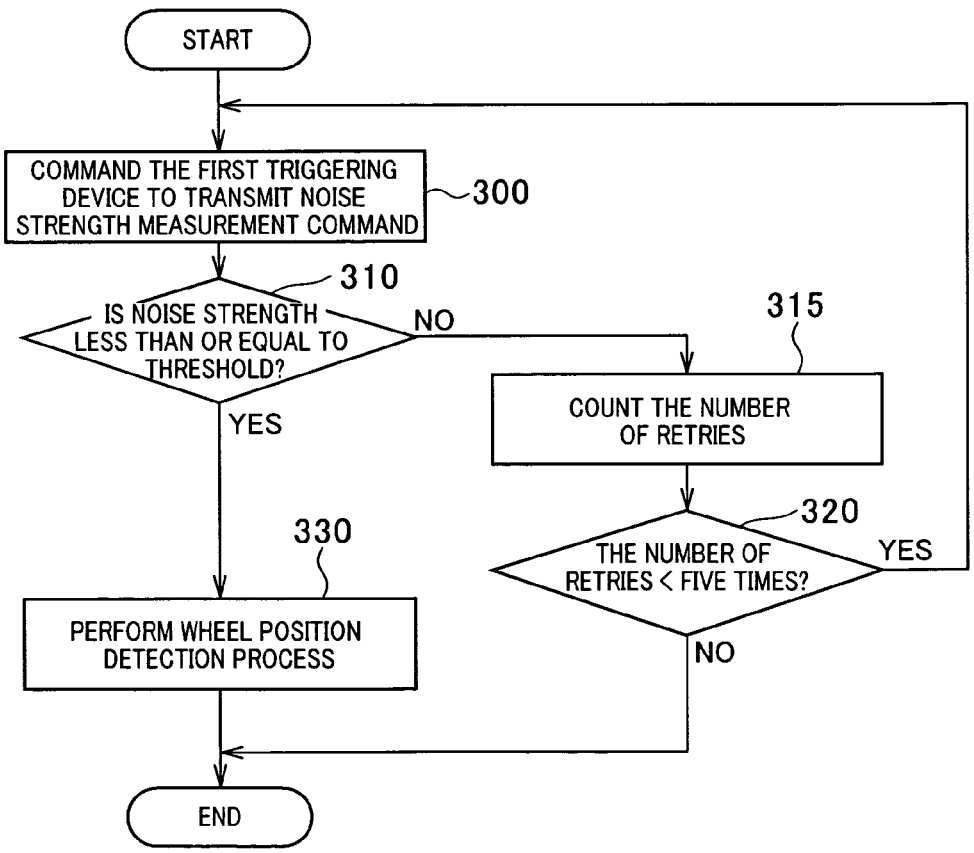
FIG. 6 is a flowchart showing a noise strength measurement process executed prior to detection of wheel positions by a control unit as a process according to a second embodiment of the present invention.

Referring to FIG. 6, a tire inflation pressure detecting apparatus according to a second embodiment of the present invention will now be described.

In the second embodiment, the identical or similar components to those in the first embodiment will be given the same reference numbers for the sake of simplified of omitted description.

The tire inflation pressure detecting apparatus according to the second embodiment is characteristic of performing a preliminary noise strength measurement before the wheel position detection, while in the first embodiment, the noise strength measurement is performed in only cases when there is no response from two transceivers.

Though the basic hardware and/or software configurations of the tire inflation pressure detecting apparatus are the same as those explained in the first embodiment, but differ from those in the first embodiment in the noise strength measurement executed by the control unit 33 of the receiver 3.

FIG. 6 shows the flowchart of a process for measuring the noise strength, which is performed prior to the wheel position detection. This noise strength measurement process is activated and performed when the control unit 33 in the receiver 3 is powered in response to a switchover of a not-shown ignition switch to its on position.

At step 300 in FIG. 3 the triggering command signal is given to the first and second triggering devices 5*a* and 5*b* when a predetermined period of time has passed since the power on. In response to this triggering command signal, the first and second triggering devices 5*a* and 5*b* transmit triggering signals each having a pre-given strength, toward the transceivers 2 attached to the right and left front wheels 6*a* and 6*b* and the right and left rear wheels 6*c* and 6*d*. Each triggering signal transmitted in this stage contains a noise strength measurement command as described in the first embodiment and formatted as shown in FIG. 5A, for instance. Hence, each transceiver 2 can measure the strength of noise, and as a response, transmit back a frame of data shown in for example FIG. 5B.

The processing is then shifted to step 310, where the receiver 3 receives the frame transmitted from each transceiver 2, reads out noise strength data therefrom, and determines whether or not the noise strength is smaller than a preset threshold. The threshold used here is a criterion to distinguish whether or not there is a possibility of receiving no response from the transceivers 2 during the wheel position detection due to strong noise.

In cases where it is determined NO at step 310 due to high-strength noise, there is a possibility that there is no response from transceivers 2 when the wheel position detection is conducted. Thus the negative determination at step 310 cause the processing to move to steps 315 and 320 in order to retry the foregoing steps. In step 315, a not-shown counter implemented in the control unit 33 is incremented to provide its count serving as the number of retries, and its count is stored therein. In step 320, it is determined whether or not the number of retries is less than five times. If the number of retries is less than five times (YES at step 320), the processing is returned to step 300, while if the number is equal to (or more than) five times (NO at step 320), the processing is stopped to avoid the wheel position detection from being performed.

On the other hand, the determination at step 310 is affirmative (YES) because of a weak noise strength, the processing is shifted to step 330 to detect the wheel position. This wheel position detection is based on a modified form from the process shown in FIG. 4, in which the foregoing steps 180, 190 and 200 are dropped and the steps 120 and 160 are directly connected to step 210. Thus when the determination at the step 120 or 160 is NO, the display device 4 can represents a system malfunction occurring in the apparatus.

In this way, in the tire inflation pressure detecting apparatus according to the present embodiment, the noise strength is measured prior to detecting the wheel positions. And the noise strength measurement reveals that the noise strength is larger, the wheel position detection is stopped. Only when it is found that the noise strength is not larger, the wheel position detection is allowed to be performed. Hence, the wheel position detection can be performed depending on noise strengths in a case-by-case approach. In addition, during the detection, if transceivers 2 cannot reply to the triggering signal, it is possible to estimate that the no-reply is attributable to a system malfunction occurring in the apparatus. Hence, when there occurs a condition in which strong noise interferes with the normal reception of the triggering signals at the transceivers 2 mounted to the wheels 6*a* to 6*d*, the wheel position detection cannot be performed. It is therefore possible to avoid the erroneous determination that there occurs a system malfunction in the apparatus despite being normal in the hardware and/or software system of this apparatus.

Modifications

Other modified forms of the foregoing embodiments can still be provided as follows.

In the first embodiment, step 180 in FIG. 2 can be modified such that, in the process of this step 180, only one triggering device 5*a* or 5*b* located on the no-reply side is allowed to transmit its triggering signal containing the noise strength measuring command. In the first embodiment, when any of the transceivers 2 mounted at the front two wheels 6*a* and 6*b* or any of the transceivers 2 mounted at the rear two wheels 6*c* and 6*d* does not issue a reply, both of the first and second triggering devices 5*a* and 5*b* transmit the triggering signal containing the noise strength measuring command. But this may be modified as above.

In the foregoing embodiments, the receiver 3 has the one antenna 31 used in common for all the transceivers 2. However, this is just one example, and may be modified to have four antennas to the transceivers 2 mounted at the four wheels 6*a* to 6*d*. In this respect, the present invention provides more usability when being applied to the former case where one common antenna is mounted, because, in the case of the common antenna, it is required to determine that each transceiver 2 is mounted at which wheel 6*a* (to 6*d*).

Additionally, in the foregoing embodiments, the process for detecting the wheel positions is performed at the time when a predetermined period of time has passed after the switchover of the ignition switch to its on state. Thus, even if there is no visual change in the tire appearance before the run of the vehicle 1, it is possible to detect a flat tire(s) or a tire(s) having largely reduced inflation pressure through the wheel position detection. Of course, timing for the wheel position detection may be changed. For example, after the tire rotation or tire exchanges, the wheel position detection may be carried out. To inform or sense the tire rotation of tire exchanges, a manually operation switch (not shown) for the wheel position detection can be mounted on the vehicle or a tilt sensor (not shown) can be mounted on the vehicular body 7 to detect a tilt thereof. Information from those switch and/or sensor is given to the apparatus for the detection process.

In the foregoing first embodiment, the trigging device 5 consists of the first and second triggering devices 5*a* and 5*b*. In contrast, only one triggering device may be located at a position whose distances from the respective transceivers 2 mounted at the four wheels 6*a* to 6*d* are different from each other. Additionally, the first embodiment adopts the first and second triggering devices 5*a* and 5*b* both located on the vehicle left side, but may be arranged on the vehicle right side.

In the foregoing embodiments, the geometrical relationship between the first and second trigging devices 5*a* and 5*b* and the four wheels 6*a* to 6*d* may be modified as below. The first triggering device 5*a* is arranged for the front and rear left wheels 6*b* and 6*d* and the second triggering device 5*b* is arranged for the front and rear right wheels 6*a* and 6*c*, in which the first triggering device 5*a* transmits the triggering signal to the paired left wheels 6*b* and 6*d*, while the second triggering device 5*b* transmits the triggering signal to the paired right wheels 6*a* and 6*c*. In this arrangement, it is preferred that the first triggering device 5*a* is closer to one of the left wheels 6*b* and 6*d* than the other, and the second triggering device 5b is closer to one of the right wheels 6a and 6c than the other. The strengths of the triggering signal at the left wheels 6b and 6d differ from each other and this is true of the right wheels 6a and 6c, with the result that the equivalent operations to the foregoing ones can be provided.

The foregoing embodiments exemplify the application to four-wheel vehicles. However, the present invention is not limited to such applications, but may be applied to larger vehicles having wheels more than four wheels and reduced into practice as the wheel position detecting apparatus and the tire inflation pressure detecting apparatus for those larger vehicles.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for detecting positions of wheels of a vehicle having a body, comprising:
   a plurality of transceivers mounted at a plurality of wheels each having a tire, wherein each transceiver comprises a first reception unit comprising means for receiving a triggering signal, a first control unit comprising means for measuring a strength of the received triggering signal and containing data indicative of the measured strength of the received triggering signal into a frame of data, and a transmission unit that transmits the frame of data produced by the first control unit;
   a triggering device, arranged to the body, that outputs triggering signal;
   a receiver, arranged to the body, comprising a second reception unit that receives the frame of data and a second control unit that determines that, based on the strength of the triggering signal expressed by the data contained in the frame of data, each transceiver is disposed at which one of the plurality of wheels; and
   an alarm member that issues an alarm when there occurs a system malfunction in the apparatus,
   wherein
   the first reception unit further comprises means for receiving a command for measuring noise strength;
   the first control unit further comprises means for calculating a strength of noise in response to reception of the command and contains data indicative of the calculated strength of the noise into a frame of data; and
   the second control unit comprise
      means for determining whether or not there is a reply of the frame of data containing the strength of the triggering signal when the triggering device transmits the triggering signal,
      means for enabling the triggering device to transmit to the transceiver the command for measuring noise strength, when no replay comes from the transceiver,
      means for determining whether or not a noise strength based on the frame of data received in response to the command is less than a threshold, and
      means for controlling the alarm member so that the alarm member is allowed to issue the alarm only when it is determined that the noise strength is less than the threshold.

2. The apparatus of claim 1, wherein
   the plurality of wheels includes front two wheels consisting of a right front wheel and a left front wheel and rear two wheels consisting of a right rear wheel and a left rear wheel;
   the triggering device includes a first triggering device disposed closer to the front two wheels than the rear two wheels and disposed to have distances mutually different from the right and left front wheels and a second triggering device disposed closer to the rear two wheels than the front two wheels and disposed to have distances mutually different from the right and left rear wheels;
   the determining means of the second control unit i) determines whether or not there is a reply of the frame of data containing the strength of the triggering signal from any of the two transceivers mounted at the two front wheels when the first triggering device transmits the triggering signal and ii) determines whether or not there is a reply of the frame of data containing the strength of the triggering signal from any of the two transceivers mounted at the two rear wheels when the second triggering device transmits the triggering signal; and
   the enabling means of the second control unit i) enables the first triggering device to transmit, at least, to the two front-side transceivers the command for measuring noise strength, when no replay comes from any of the two front-side transceivers and ii) enables the second triggering device to transmit, at least, to the two rear-side transceivers the command for measuring noise strength, when no replay comes from any of the two rear-side transceivers.

3. The apparatus of claim 2, wherein, when no replay comes from any of the two front-side transceivers in response to the transmission of the trigging signal from the first triggering device or no replay comes from any of the two rear-side transceivers in response to the transmission of the triggering signal from the second triggering device, the enabling means of the second control unit enables both of the first and second triggering devices to transmit, to the transceivers mounted at the front and rear wheels, the command for measuring noise strength.

4. The apparatus of claim 1, wherein the first control unit comprises the means for measuring the strength of the noise whose frequencies fall into a frequency range of 100 to 200 kHz.

5. An apparatus for detecting positions of wheels of a vehicle having a body, comprising:
   a plurality of transceivers mounted at a plurality of wheels each having a tire, wherein each transceiver comprises a first reception unit comprising means for receiving a triggering signal, a first control unit comprising means for measuring a strength of the received triggering signal and containing data indicative of the measured strength of the received triggering signal into a frame of data, and a transmission unit that transmits the frame of data produced by the first control unit;
   a triggering device, arranged to the body, that outputs the triggering signal;
   a receiver, arranged to the body, comprising a second reception unit that receives the frame of data and a second control unit that determines that, based on the strength of the triggering signal expressed by the data contained in the frame of data, each transceiver is disposed at which one of the plurality of wheels; and
   an alarm member that issues an alarm when there occurs a system malfunction in the apparatus, wherein
the first reception unit further comprises means for receiving a command for measuring noise strength;
the first control unit further comprises means for calculating a strength of noise in response to reception of the command and contains data indicative of the calculated strength of the noise into a frame of data; and
the second control unit comprise
means for determining whether or not there is a reply of the frame of data containing the strength of the triggering signal when the triggering device transmits the triggering signal,
means for controlling the alarm member so that the alarm member is allowed to issue the alarm when it is determined that no reply of the frame of data containing the strength of the triggering signal comes from the transceivers,
first determining means for means for enabling the triggering device to transmit to the transceiver the command for measuring noise strength prior to detecting positions of the wheels,
means for determining whether or not a noise strength based on the frame of data received in response to the command is less than a threshold,
second determining means for enabling the triggering device to transmit the triggering signal for detecting positions of the wheels, when it is determined that the noise strength is less than the threshold, and
means for stopping detection of the positions of the wheels when it is determined the noise strength is equal to or larger than the threshold.

6. The apparatus of claim 5, wherein
the plurality of wheels includes front two wheels consisting of a right front wheel and a left front wheel and rear two wheels consisting of a right rear wheel and a left rear wheel;
the triggering device includes a first triggering device disposed closer to the front two wheels than the rear two wheels and disposed to have distances mutually different from the right and left front wheels and a second triggering device disposed closer to the rear two wheels than the front two wheels and disposed to have distances mutually different from the right and left rear wheels; and
the first determining means of the second control unit enables both the first and second triggering devices to transmit the command for measuring the noise strength prior to detecting the positions of the wheels.

7. The apparatus of claim 6, wherein the first control unit comprises the means for measuring the strength of the noise whose frequencies fall into a frequency range of 100 to 200 kHz.

8. An apparatus for detecting positions of wheels of a vehicle having a body, comprising:
a plurality of transceivers mounted at a plurality of wheels each having a tire, wherein each transceiver comprises a first reception unit comprising means for receiving a triggering signal, a first control unit comprising means for calculating a strength of the received triggering signal and measuring data indicative of the measured strength of the received triggering signal into a frame of data, and a transmission unit that transmits the frame of data produced by the first control unit;
a triggering device, arranged to the body, that outputs the triggering signal; and
a receiver, arranged to the body, comprising a second reception unit that receives the frame of data and a second control unit that determines that, based on the strength of the triggering signal expressed by the data contained in the frame of data, each transceiver is disposed at which one of the plurality of wheels,
wherein
the first reception unit further comprises means for receiving a command for measuring noise strength;
the first control unit further comprises means for calculating a strength of noise in response to reception of the command and contains data indicative of the calculated strength of the noise into a frame of data; and
the second control unit comprise means for determining whether or not a noise strength based on the frame of data received in response to the command is less than a threshold which is set to stop detection of positions of the wheels.

9. The apparatus of claim 8, wherein the first control unit comprises the means for measuring the strength of the noise whose frequencies fall into a frequency range of 100 to 200 kHz.

10. An apparatus for detecting inflation pressure of tires mounted to wheels of a vehicle having a body, comprising:
a plurality of transceivers mounted at a plurality of wheels each having a tire, wherein each transceiver comprises a first reception unit comprising means for receiving a triggering signal, a first control unit comprising means for measuring a strength of the received triggering signal and containing data indicative of the measured strength of the received triggering signal into a frame of data, and a transmission unit that transmits the frame of data produced by the first control unit and a signal showing inflation pressure of each tire;
a triggering device, arranged to the body, that outputs the triggering signal;
a receiver, arranged to the body, comprising a second reception unit that receives the frame of data and a second control unit that determines that, based on the strength of the triggering signal expressed by the data contained in the frame of data, each transceiver is disposed at which one of the plurality of wheels, the determined positions of the respective transceivers corresponding to positions of the wheels; and
an alarm member that issues an alarm when there occurs a system malfunction in the apparatus,
wherein
the transceiver comprise a sensing unit that senses the signal showing inflation pressure of each tire;
the transmission unit of the each transceiver transmits the signal sensed by the sensing unit as well as the frame of data produced by the first control unit;
the first reception unit further comprises means for receiving a command for measuring noise strength;
the first control unit further comprises means for calculating a strength of noise in response to reception of the command and contains data indicative of the calculated strength of the noise into a frame of data;
the second control unit comprise
means for determining whether or not there is a reply of the frame of data containing the strength of the triggering signal when the triggering device transmits the triggering signal,
means for enabling the triggering device to transmit to the transceiver the command for measuring noise strength, when no replay comes from the transceiver,
means for determining whether or not a noise strength based on the frame of data received in response to the command is less than a threshold, means for controlling the alarm member so that the alarm member is allowed to issue the alarm only when it is determined that the noise strength is less than the threshold, and means for calculating the inflation pressure of each tire based on the signal sensed by the sensing unit and transmitted to the receiver by the transmission unit.

11. A transceiver used for an apparatus for detecting positions of wheels of a vehicle having a body, the transceiver being mounted at each wheel, the transceiver comprising:

a reception unit comprising means for receiving a triggering signal from a triggering device mounted to the body;

a control unit comprising means for measuring a strength of the received triggering signal and containing data indicative of the calculated strength of the received triggering signal into a frame of data and means for measuring a strength of noise in response to a command signal issued from the trigging device and containing the data indicative of the measured strength of the noise into a frame of data; and a transmission unit that transmits the frames of data produced by the control unit.

* * * * *

UNITED STATES PATENT AND TRADEMARK OFFICE
CERTIFICATE OF CORRECTION

| | | |
|---|---|---|
| PATENT NO. | : 7,825,788 B2 | Page 1 of 1 |
| APPLICATION NO. | : 12/171446 | |
| DATED | : November 2, 2010 | |
| INVENTOR(S) | : Mori | |

It is certified that error appears in the above-identified patent and that said Letters Patent is hereby corrected as shown below:

At column 15, line 60, "replay" should be --reply--;

At column 16, lines 26 and 30, "replay" should be --reply--;

At column 16, lines 32 and 35, "replay" should be --reply--;

At column 18, line 12, "comprise" should be --comprises--; and

At column 18, line 64, "replay" should be --reply--.

Signed and Sealed this
Twenty-second Day of March, 2011

David J. Kappos
*Director of the United States Patent and Trademark Office*